(12) United States Patent
Longo et al.

(10) Patent No.: US 7,895,729 B2
(45) Date of Patent: Mar. 1, 2011

(54) PROCESS FOR MOUNTING MAGNETS IN AN ELECTRIC MOTOR ROTOR

(75) Inventors: Gelson Longo, Joinvill-Sc (BR); Orlando Starke, Joinville-Sc (BR); Roberto Claudio Hille, Joinville-Sc (BR); Jose Walter Mohr, Joinville-Sc (BR); Arturo Rivio Ramirez, Joinville-Sc (BR)

(73) Assignee: Whirlpool S.A., Sao Paulo-Sp (BR)

( * ) Notice: Subject to any disclaimer, the term of this patent is extended or adjusted under 35 U.S.C. 154(b) by 397 days.

(21) Appl. No.: 11/569,860

(22) PCT Filed: Jun. 6, 2005

(86) PCT No.: PCT/BR2005/000100
§ 371 (c)(1),
(2), (4) Date: Apr. 3, 2007

(87) PCT Pub. No.: WO2005/122362
PCT Pub. Date: Dec. 22, 2005

(65) Prior Publication Data
US 2008/0157620 A1    Jul. 3, 2008

(30) Foreign Application Priority Data
Jun. 7, 2004   (BR) .................................... 0402303

(51) Int. Cl.
*H02K 15/03* (2006.01)
*H02K 1/27* (2006.01)
(52) U.S. Cl. .................. 29/598; 310/156.22; 310/156.78
(58) Field of Classification Search .................... 29/596, 29/598; 310/156.78, 156.22, 156.23
See application file for complete search history.

(56) References Cited

U.S. PATENT DOCUMENTS
4,322,648 A      3/1982   Ray et al.
2004/0256940 A1*  12/2004   Tsuruta et al. ........... 310/156.53

FOREIGN PATENT DOCUMENTS
WO    WO-01/06624        1/2001
WO    WO 0106624 A1 *    1/2001

* cited by examiner

Primary Examiner — A. Dexter Tugbang
Assistant Examiner — Livius R Cazan
(74) Attorney, Agent, or Firm — Gifford, Krass, Sprinkle, Anderson & Citkowski, P.C.

(57) ABSTRACT

A process for mounting magnets in an electric motor rotor and an electric motor rotor, said rotor comprising: a lamination stack (10) provided with a plurality of axial channels (12) disposed around a central axial bore (11) and housing permanent magnets (20); and a rotor cage (30) formed by a pair of end rings (31), each seated against an adjacent end lamination of the lamination stack (10) and interconnected by a plurality of bars (32), said process comprising the steps of: forming an end, ring (31) with at least one inner radial projection (33) disposed radially external to the projection of the contour of an axial channel (12); mounting in each axial channel (12) at least one permanent magnet (20); and deforming each inner radial projection (33) in order to increase its radial extension the sufficient to radially cover at least part of the projection of the contour of said axial channel (12), defining a stop for axially retaining the respective permanent magnet (20). The present invention further provides an electric motor rotor having the characteristics defined above.

6 Claims, 2 Drawing Sheets

PROCESS FOR MOUNTING MAGNETS IN AN ELECTRIC MOTOR ROTOR

FIELD OF THE INVENTION

The present invention refers to a process for mounting permanent magnets in housings formed in the lamination stack of the rotor and to an electric motor rotor, particularly the rotor of small electric motors of the synchronous type, such as those used in the hermetic compressors of small refrigeration systems.

BACKGROUND OF THE INVENTION

The rotors of synchronous electric motors are used in household appliances, such as refrigerators, freezers, air conditioners, hermetic compressors, laundry machines, pumps, fans, etc.

Such motors are usually formed by a stator, a rotor and permanent magnets, said rotor being of the type formed by a rotor core, which carries the permanent magnets, and a rotor cage usually made of aluminum and formed by end rings connected to aluminum axial bars formed during a casting process of said rotor cage.

The rotor core includes a stack of superposed annular steel laminations provided with openings longitudinally aligned with the openings of the other laminations of the stack so as to define a plurality of axial channels interconnecting the external faces of the end laminations of the stack and which are angularly spaced apart along a circular alignment concentric to the longitudinal axis of the lamination stack, but radially spaced back in relation to a circumferential alignment of peripheral housings to be filled with a forming material of the rotor cage during the casting process of the latter, forming the axial bars thereof.

The rotor cage presents, adjacent to each end of the rotor core, an end ring, or short-circuit ring, which generally restrains, directly or indirectly the permanent magnets from being axially displaced out from the magnet housings of the rotor.

In a known solution disclosed in WO 01/06624, the axial retention of the permanent magnets is achieved by providing an end cap closing each end of the rotor core and onto which is seated at least one inner peripheral portion of an adjacent end ring of the rotor cage. While this solution avoids the involuntary escape of each permanent magnet in relation to its respective housing, it presents some inconveniences such as high cost and loss of efficiency when the end caps are made of electric steel, for example.

OBJECTS OF THE INVENTION

Thus, it is an object of the present invention to provide a process for mounting magnets to an electric motor rotor, which besides maintaining the efficiency of the motor does not increase its cost and maintains the magnets housed in the interior of the rotor, which can thus be handled and mounted until the step of magnetizing the magnets.

It is a further object of the present invention to provide an electric motor rotor which can keep the permanent magnets housed in the interior of grooves provided in the lamination stack of the rotor core under operating conditions, in order to avoid that, eventually, said motor can have its magnetic field weakened or annulled.

SUMMARY OF THE INVENTION

These and other objects are attained through a process for mounting magnets to an electric motor rotor, said rotor comprising: a lamination stack provided with a central axial bore; a plurality of axial channels disposed around the central axial bore; and axial bores disposed in a peripheral portion of the lamination stack and which are external to the axial channels; permanent magnets housed in the axial channels so as to define the rotor poles; and a rotor cage formed by a pair of end rings, each seated against an adjacent end lamination of the lamination stack and interconnected by a plurality of bars which are cast in the axial bores in a single piece with the end rings, said process comprising the steps of: forming an end ring with at least one inner radial projection adjacent to each respective axial channel, said inner radial projection being disposed radially external to the projection of the contour of said axial channel; mounting in each axial channel at least one respective permanent magnet; and deforming each inner radial projection so as to increase its radial extension the sufficient to radially cover at least part of the projection of the contour of said axial channel, defining a stop for axially retaining the respective permanent magnet.

The present invention further provides an electric motor rotor having the characteristics defined above, in which at least one of the end rings of the rotor cage incorporates at least one inner radial projection adjacent to each respective axial channel, said inner radial projection being, in a pre-mounting condition of the permanent magnets, radially external to the projection of the contour of the respective axial channel and, in a post-mounting condition of the permanent magnets, deformed, in order to radially cover at least part of the projection of the contour of said axial channel, defining a stop for axially retaining the respective permanent magnet in the direction of the adjacent end ring.

BRIEF DESCRIPTION OF THE DRAWINGS

The invention will be described below with reference to the enclosed drawings, in which.

DESCRIPTION OF THE ILLUSTRATED EMBODIMENT

Figure 1:
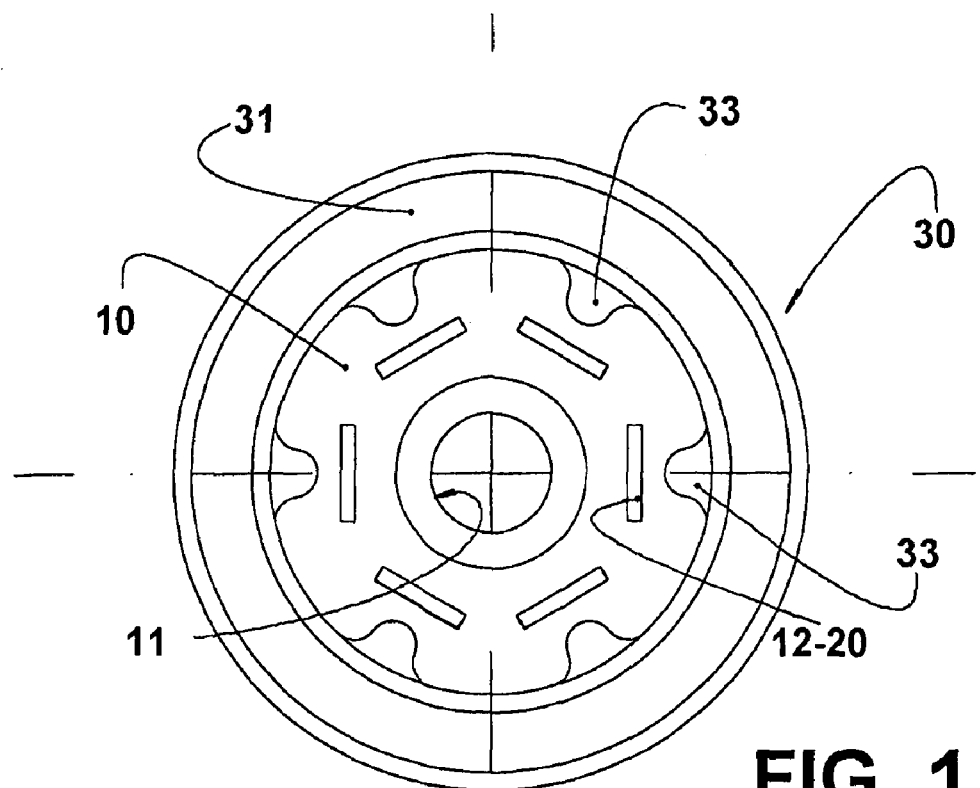
FIG. 1 is a schematic top plan view of a rotor having an end ring of its rotor cage constructed according to the present invention, in a pre-mounting condition of the permanent magnets in the lamination stack of the rotor.
Figure 2:
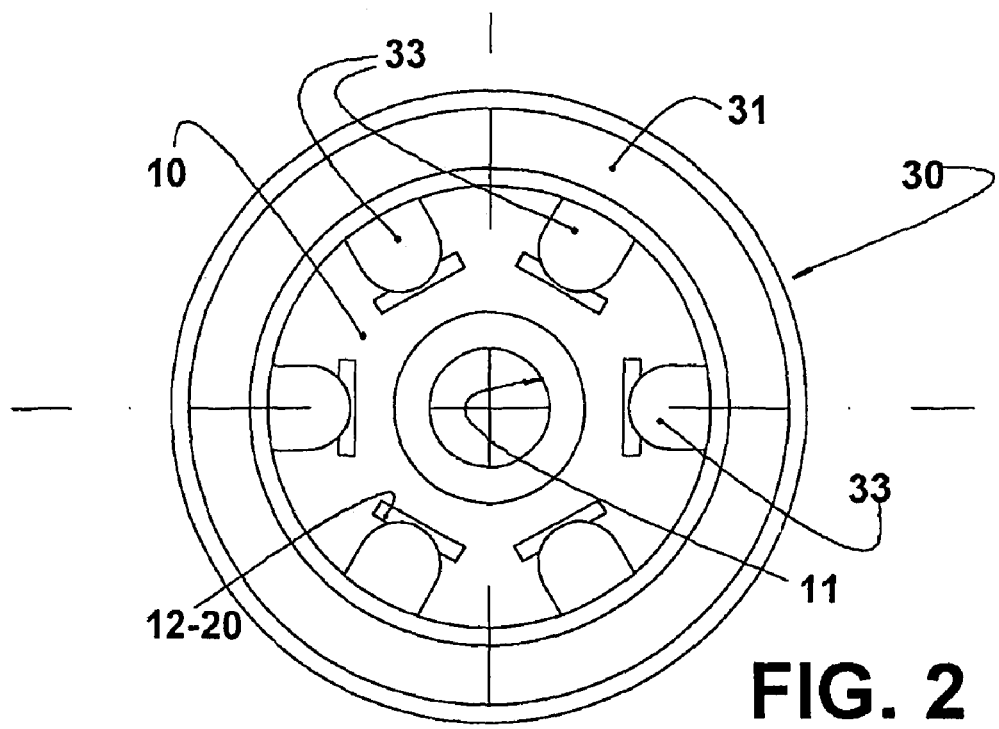
FIG. 2 is a schematic top plan view of the rotor illustrated in FIG. 1, but in the post-mounting condition of the permanent magnets in the lamination stack of the rotor.
Figure 3:
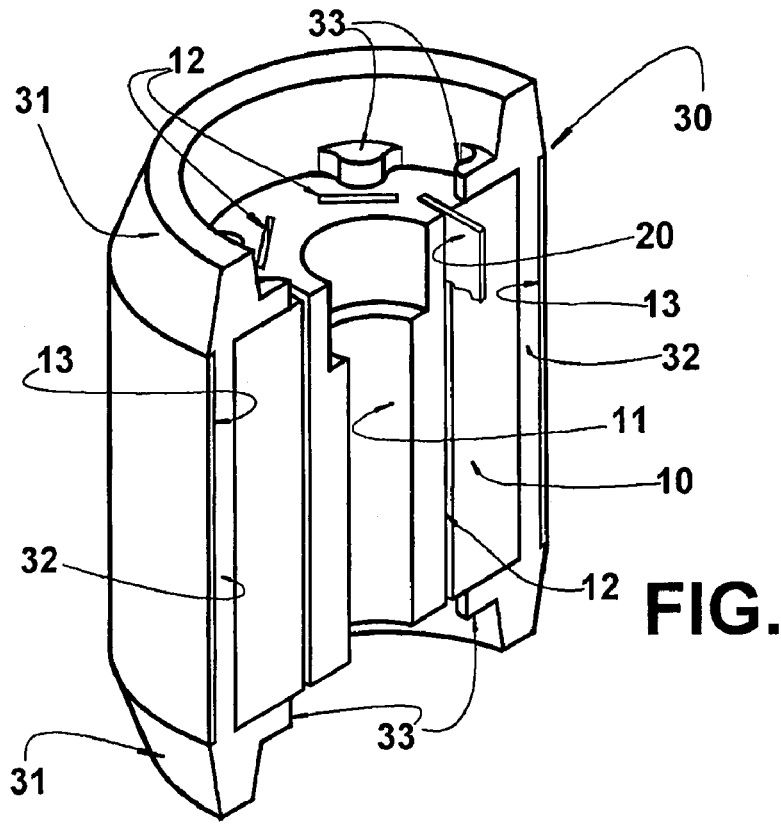
FIG. 3 is a schematic longitudinal sectional view of the rotor illustrated in FIG. 1.
Figure 4:
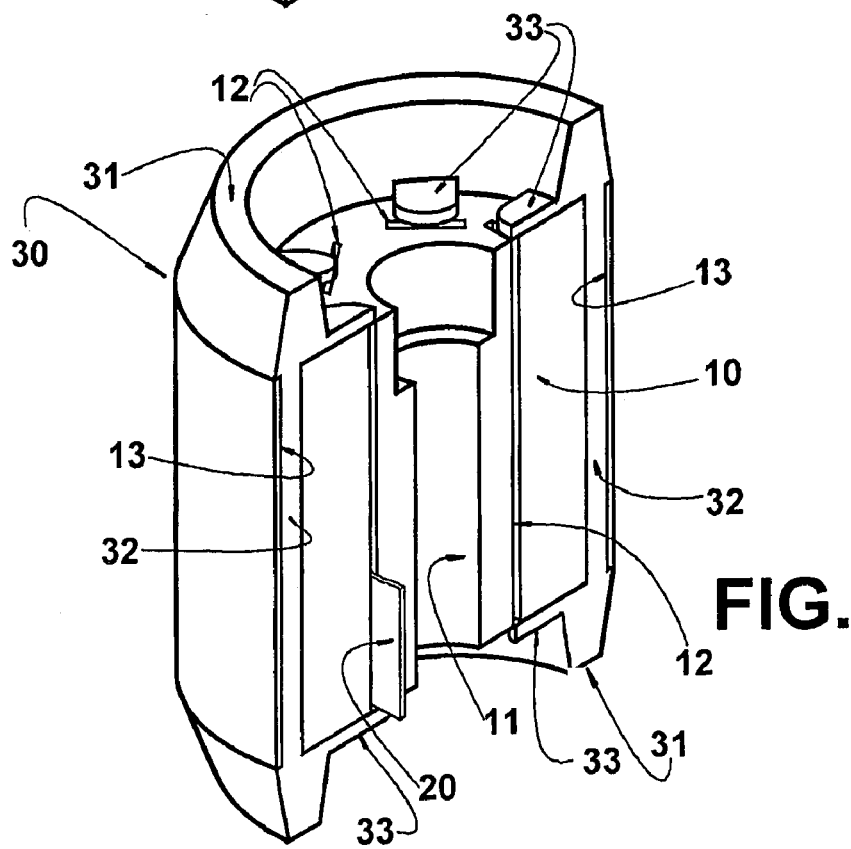
FIG. 4 is a schematic longitudinal sectional view of the rotor illustrated in FIG. 2.

The present invention will be described in relation to an electric motor rotor of the type comprising a rotor core formed by a lamination stack 10 lodging permanent magnets 20, and a rotor cage 30 generally made of aluminum.

The lamination stack 10 of the rotor core is formed by a plurality of superposed steel annular laminations provided with openings longitudinally aligned with the openings of the other laminations of the stack, defining a central axial bore 11 in the lamination stack 10; a plurality of axial channels 12 disposed around the central axial bore 11, and axial bores 13 disposed in a peripheral portion of the lamination stack 10 external to the axial channels 12 that interconnect the external faces of the end laminations of the lamination stack 10. Each axial channel 12 is dimensioned to lodge at least one permanent magnet 20, said permanent magnets 20 defining the rotor poles.

The axial channels 12 are arranged angularly spaced from each other along a circular alignment concentric to the longitudinal axis of the lamination stack 10 but radially and internally spaced back in relation to a circumferential alignment of axial bores 13 to be filled with a formation material of the rotor cage 30 during its forming process.

The rotor cage 30 presents, adjacent to each end of the rotor core, an end ring 31, or short-circuit ring, each seated against an adjacent end lamination of the lamination stack 10, said end rings 31 being interconnected by a plurality of bars 32 which are cast in the axial bores 13 in a single piece with the end rings 31 upon formation of the rotor cage 30.

According to the present invention, the process of mounting the permanent magnets in an electric motor rotor generally comprises the steps of:

a—forming an end ring 31 of the rotor cage 30 with at least one inner radial projection 33 adjacent to each respective axial channel 12 of the lamination stack 10 of the rotor, said inner radial projection 33 being disposed radially external to the projection of the contour of said axial channel 12;

b—mounting in each axial channel 12 at least one respective permanent magnet 20; and c—deforming each inner radial projection 33 in order to increase its radial extension the sufficient to radially cover at least part of the projection of the contour of said axial channel 12, defining a stop for axially retaining the respective permanent magnet 20.

In order to retain the permanent magnets 20 in the respective axial channels 12, the present mounting process comprises a step of deforming each inner radial projection 33, for example by mechanical deformation, such as beading.

According to one way of carrying out the present invention, the inner radial projections 33 are provided from an inner face of a respective end ring 31, for example from an inner peripheral edge of said end ring 31.

In the illustrated construction, the inner radial projections 33 are provided from the inner peripheral edge of a respective end ring 31 and seated on the adjacent end lamination of the lamination stack 10.

According to the present invention, at least one of the end rings 31 of the rotor cage 30 incorporates, from a respective inner peripheral edge, a plurality of inner radial projections 33 defined upon formation of the rotor cage 30 and which are disposed according to a circumferential alignment radially external to the circumferential alignment of axial channels 12 of the lamination stack 10, at least one inner radial projection 33 being provided adjacent to a respective axial channel 12 of the lamination stack 10, each said inner radial projection 33 remaining, in a pre-mounting condition of the permanent magnets 20, radially external to the projection of the contour of the respective axial channel 12 and, in a post-mounting condition of the permanent magnets 20, deformed so as to radially cover at least part of the projection of the contour of said axial channel 12, defining a stop for axially retaining the respective permanent magnet 20 inside said axial channel 12, in order to avoid displacements of said permanent magnet 20 in the direction of the adjacent end ring 31.

In the illustrated construction, the inner radial projections 33 are defined seated on the adjacent end lamination of the lamination stack 10, so that each axial channel 12 is associated with a respective inner radial projection 33. However, it should be understood that, according to the present invention, other constructions for the positioning of one or more inner radial projections 33 in relation to the adjacent end lamination are possible, such as by providing said inner radial projections 33 axially spaced from the adjacent end lamination of the lamination stack 10.

In the illustrated solution, both end rings 31 are provided with inner radial projections 33, though within the inventive concept presented herein only one of said end rings 31 can be provided with said inner radial projections 33 and the retention of the permanent magnets 20 adjacent to the other end ring 31 of the rotor cage 30 can be obtained by other known means, for example upon formation of the rotor cage.

For the illustrated solution in which both end rings are provided with inner radial projections 33, in the present process for mounting magnets in an electric motor rotor the step of deforming the inner radial projections 33 of each end ring 31 can occur after mounting the permanent magnets 20 in the respective axial channels 12.

In another solution, the step of deforming the inner radial projections 33 of one of the end rings 31 occurs before lodging the permanent magnets 20 in the axial channels 12, and the deformation of the inner radial projections 33 of the other end ring 31 is effected after placing said permanent magnets 20 in the axial channels 12.

The invention claimed is:

1. A process for mounting magnets in an electric motor rotor, said rotor comprising:

a lamination stack provided with a central axial bore, a plurality of axial channels disposed around the central axial bore, and axial bores disposed in a peripheral portion of the lamination stack and which are external to the axial channels;

permanent magnets housed in the axial channels so as to define the rotor poles; and a rotor cage formed by a first and a second end ring, each end ring seated against a corresponding adjacent end lamination of the lamination stack and connected to the other of the rings by a plurality of bars which are cast in the axial bores in a single piece with the first and second end rings, said process comprising the steps of:

forming the first end ring seated against its corresponding end lamination, with at least one inner radial projection adjacent to each axial channel, such that, for each axial channel, the at least one projection corresponding thereto is disposed radially external to a corresponding opening, in said end lamination, defined by a projection onto said end lamination of a contour of said axial channel;

mounting in each axial channel at least one respective permanent magnet; and deforming each of the projections in order to increase its radial extension sufficiently to radially cover at least part of the opening corresponding thereto, thereby defining a stop for axially retaining the respective permanent magnet.

2. The process as set forth in claim 1, wherein each of the at least one inner radial projections is seated on its corresponding adjacent end lamination of the lamination stack.

3. The process as set forth in claim 1, wherein the deformation of each of the at least one inner radial projection is carried out mechanically.

4. The process as set forth in claim 3, wherein each of the at least one inner radial projection is beaded on its corresponding adjacent end lamination of the lamination stack.

5. The process as set forth in claim 1, further comprising the step of forming the second end ring seated against its corresponding end lamination, with at least one inner radial projection adjacent to each axial channel, such that, for each axial channel, the at least one projection corresponding thereto is disposed radially external to a corresponding opening, in said end lamination, defined by a projection onto said end lamination of a contour of said axial channel.

6. A process for mounting magnets in an electric motor rotor, said rotor comprising:
- a lamination stack provided with a central axial bore, a plurality of axial channels disposed around the central axial bore, and axial bores disposed in a peripheral portion of the lamination stack and which are external to the axial channels;
- permanent magnets housed in the axial channels so as to define rotor poles; and
- a rotor cage formed by a first and a second end ring, each end ring seated against a corresponding adjacent end lamination of the lamination stack and connected to the other of the rings by a plurality of bars which are cast in the axial bores in a single piece with the first and second end rings, said process comprising the steps of:
- forming the first end ring seated against its corresponding end lamination, with at least one inner radial projection adjacent to each axial channel such that, for each axial channel, the at least one projection corresponding thereto is disposed radially external to a corresponding opening, in said lamination, defined by a projection onto said end lamination of a contour of said each axial channel;
- forming the second end ring seated against its corresponding end lamination, with at least one inner radial projection adjacent to each axial channel, such that, for each axial channel, the at least one projection corresponding thereto is disposed radially external to a corresponding opening, in said end lamination, defined by a projection onto said end lamination of a contour of said axial channel;
- deforming each of the projections of the first end ring in order to increase its radial extension sufficiently to radially cover at least part of the opening corresponding thereto, thereby defining a stop for axially retaining at least one permanent magnet in the direction of the first end ring;
- mounting in each axial channel the at least one permanent magnet; and
- deforming each of the inner radial projections of the second end ring in order to increase its radial extension sufficiently to radially cover at least part of the opening corresponding thereto, thereby defining a stop for axially retaining the at least one permanent magnet in the direction of the second end ring.

* * * * *